US 10,330,349 B2
Jun. 25, 2019

(12) United States Patent
Zaynulin et al.

(54) THERMAL ENERGY SYSTEM AND METHOD OF OPERATION (71) Applicants: Dmitriy Zaynulin, London (GB); Kevin Stickney, Stratford-Upon-Avon (GB)

(72) Inventors: Dmitriy Zaynulin, London (GB); Kevin Stickney, Stratford-Upon-Avon (GB)

(73) Assignee: ERDA MASTER IPCO LIMITED, St. Heller, Jersey (GB)

( * ) Notice: Subject to any disclaimer, the term of this patent is extended or adjusted under 35 U.S.C. 154(b) by 754 days.

(21) Appl. No.: 14/425,969

(22) PCT Filed: Sep. 5, 2013

(86) PCT No.: PCT/EP2013/068398
§ 371 (c)(1),
(2) Date: Mar. 4, 2015

(87) PCT Pub. No.: WO2014/037459
PCT Pub. Date: Mar. 13, 2014

(65) Prior Publication Data
US 2015/0219365 A1    Aug. 6, 2015

(30) Foreign Application Priority Data
Sep. 5, 2012    (GB) .................................... 1215840.8

(51) Int. Cl.
*F24T 10/10*    (2018.01)
*F24D 3/18*    (2006.01)
(Continued)

(52) U.S. Cl.
CPC ................ *F24T 10/10* (2018.05); *F24D 3/18* (2013.01); *F24D 19/1045* (2013.01);
(Continued)

(58) Field of Classification Search
CPC . F28D 30/06; F28D 20/0052; F25B 2313/002
See application file for complete search history.

(56) References Cited

U.S. PATENT DOCUMENTS 3,339,629 A * 9/1967 Hervey ................. F24F 5/0046
165/45
5,244,037 A * 9/1993 Warnke ..................... F24D 3/18
137/565.34
(Continued)

FOREIGN PATENT DOCUMENTS

DE    102007037474 A1    2/2009
GB    2502341 A    11/2013

OTHER PUBLICATIONS

Examination Report dated Oct. 9, 2015 in corresponding application GB1215840.8.
(Continued)

*Primary Examiner* — Ljiljana V. Ciric
*Assistant Examiner* — Alexis K Cox
(74) *Attorney, Agent, or Firm* — Polsinelli PC (57) ABSTRACT Thermal energy system, coupled to a building energy system, which selectively provides heating and/or cooling to a building. The thermal energy system includes a heat pump system, first and second geothermal systems, and first and second switch assemblies, and
the first and second switch assemblies are selectively switchable to thermally interconnect the first and second geothermal systems to each other on a primary input side of the heat pump system or on a second output side of the heat pump system, and:
a) the first and second switch assemblies are adapted to be switchable to provide a first operation mode which thermally connects the first geothermal system to the heating output and the second geothermal system to the
(Continued)

cooling output, and the heat pump system being thermally unconnected to the first and second geothermal systems; or b) the first and second switch assemblies are adapted to be switchable to provide a first operation mode which thermally connects together the first and second geothermal systems via the heat pump system, and the heating output and cooling output being thermally unconnected to the first and second geothermal systems.

31 Claims, 6 Drawing Sheets

(51) Int. Cl.
    *F24D 19/10*     (2006.01)
    *F24F 5/00*     (2006.01)
    *F24T 50/00*     (2018.01)

(52) U.S. Cl.
    CPC ............ *F24F 5/0046* (2013.01); *F24T 50/00* (2018.05); *F24D 2200/11* (2013.01); *F24D 2200/123* (2013.01); *F24D 2200/14* (2013.01); *F24F 2005/0057* (2013.01); *F24F 2005/0064* (2013.01); *F24F 2203/021* (2013.01); *Y02A 30/272* (2018.01); *Y02B 10/20* (2013.01); *Y02B 10/24* (2013.01); *Y02B 10/40* (2013.01); *Y02B 10/70* (2013.01); *Y02B 30/12* (2013.01); *Y02E 10/12* (2013.01); *Y02E 10/46* (2013.01)

(56) References Cited

U.S. PATENT DOCUMENTS

| 9,518,787 | B2* | 12/2016 | Pilebro | F28D 20/0039 |
| 2004/0206085 | A1* | 10/2004 | Koenig | F24J 3/08 |
| | | | | 60/641.1 |
| 2007/0205298 | A1* | 9/2007 | Harrison | F24D 11/0221 |
| | | | | 237/2 B |
| 2010/0288465 | A1* | 11/2010 | Stewart | F03G 7/04 |
| | | | | 165/45 |
| 2011/0197599 | A1* | 8/2011 | Stewart | F03G 7/04 |
| | | | | 62/56 |
| 2012/0090807 | A1* | 4/2012 | Stewart | F03G 7/04 |
| | | | | 165/45 |
| 2012/0152488 | A1* | 6/2012 | Yatchak | F28D 20/0043 |
| | | | | 165/45 |
| 2016/0334116 | A1* | 11/2016 | Zaynulin | F24D 10/006 |

OTHER PUBLICATIONS

Examination Report under Section 18(3) dated Oct. 9, 2015 in priority application GB1215840.8.
Response to Examination Report dated Oct. 9, 2015 dated Mar. 8, 2016 in priority application GB1215840.8.

* cited by examiner

THERMAL ENERGY SYSTEM AND METHOD OF OPERATION

FIELD OF THE INVENTION

The present invention relates to a thermal energy system and to a method of operating a thermal energy system. The present invention has particular application in such a system coupled to or incorporated in a building, in particular a domestic residential building or an industrial or commercial building. The present invention also has wide application within areas such as centralised cooling and heating systems and industrial refrigeration and/or process heating.

BACKGROUND

Many buildings have a demand for heating and/or cooling generated by systems within the building. For example, heating, ventilation and air conditioning (HVAC) systems may at some times require a positive supply of heat or at other times require cooling, or both, heating and cooling simultaneously. Some buildings, such as supermarkets, incorporate large industrial scale refrigeration systems which incorporate condensers which require constant sink for rejection of the heat. Many of these systems require constant thermometric control to ensure efficient operation. Inefficient operation can result in significant additional operating costs, particularly with increasing energy costs.

It is known to use a ground coupled heat pump system to deliver heating energy to a building having a heating demand. However, when the building has a cooling demand, either alternative to the heating demand or simultaneously with the heating demand, there is generally required further operative systems to effect the cooling demand, for example an additional chiller or a system to operate the heat pump system, for example having a vapor compression cycle, in a reverse flow operation. Such additional operative systems increase the cost and complexity of the ground coupled heat pump system.

The efficiency of a heating and cooling system in a building can sometimes be rather low, because the system is not capable of effectively capturing energy which has been gained by use of the building, for example from human activity, solar energy, lighting, use of electrical equipment such as IT systems, etc.

There is a need in the art for a thermal energy system which at least partially can overcome these problems of known systems.

In particular, there is a need in the art for a thermal energy system which can have reduced capital costs and complexity as compared to known systems yet still provide greater efficiency of the heating and cooling cycles which can be selected either alternatively or simultaneously, with correspondingly reduced input energy to the compression pump of the ground coupled heat pump system throughout the year.

The present invention aims to meet these needs.

SUMMARY OF THE INVENTION

The present invention provides a thermal energy system adapted to be coupled to a building energy system which selectively provides heating and/or cooling to a building, the thermal energy system comprising a heat pump system having an output for a working fluid connected to a heating output of the thermal energy system, a first geothermal system in which a working fluid is, in use, circulated, a first switch assembly selectively connecting the first geothermal system to at least one of the heating output of the thermal energy system and an input for a working fluid of the heat pump system, a second geothermal system in which a working fluid is, in use, circulated, and a second switch assembly selectively connecting the second geothermal system to at least one of a cooling output of the thermal energy system and the input of the heat pump system.

The present invention also provides a method of operating a thermal energy system coupled to a building energy system which selectively provides heating and/or cooling to a building, the method comprising the steps of;

(a) providing a heat pump system having an output for a working fluid connected to a heating output of the thermal energy system to provide heating to the building, a first geothermal system in which a working fluid is circulated and a second geothermal system in which a working fluid is circulated;

(b) selectively connecting the first geothermal system to at least one of the heating output and an input for a working fluid of the heat pump system, or to the output of the heat pump system; and (c) selectively connecting the second geothermal system to at least one of the input of the heat pump system and a cooling output of the thermal energy system to provide cooling to the building.

The present invention further provides a thermal energy system comprising a heat pump system having a primary input side for working fluid and a secondary output side for working fluid, a first geothermal system in which working fluid is, in use, circulated, a second geothermal system in which working fluid is, in use, circulated, a first switch assembly selectively connecting the first geothermal system to the primary input side or to the secondary output side and a second switch assembly selectively connecting the second geothermal system to the primary input side, the first and second switch assemblies being selectively switchable to interconnect the first and second geothermal systems on the primary input side or on the secondary output side.

The present invention yet further provides a method of operating a thermal energy system, the method comprising the steps of;

(a) providing a heat pump system having a primary input side for working fluid and a secondary output side for working fluid, a first geothermal system in which working fluid is circulated, and a second geothermal system in which working fluid is circulated;

(b) selectively connecting the first geothermal system to the primary input side or to the secondary output side; and (c) selectively connecting the second geothermal system to the primary input side; wherein the first and second geothermal systems are interconnected on the primary input side or on the secondary output side.

The present invention also has wider application within areas such as centralised cooling and heating systems and industrial refrigeration and or process heating demand.

BRIEF DESCRIPTION OF THE DRAWINGS

Embodiments of the present invention will now be described by way of example only, with reference to the accompanying drawings, in which.

DETAILED DESCRIPTION

The preferred embodiments of the present invention concern thermal energy systems for interface with any building systems that have a demand for heating and/or cooling generated by systems within the building, for example heating, ventilation and air conditioning (HVAC) systems, and/or refrigeration systems which may require a positive supply of heat and/or cooling, or a negative supply of heat. Many of these systems require very careful and constant thermometric control to ensure efficient operation.

Figure 1:
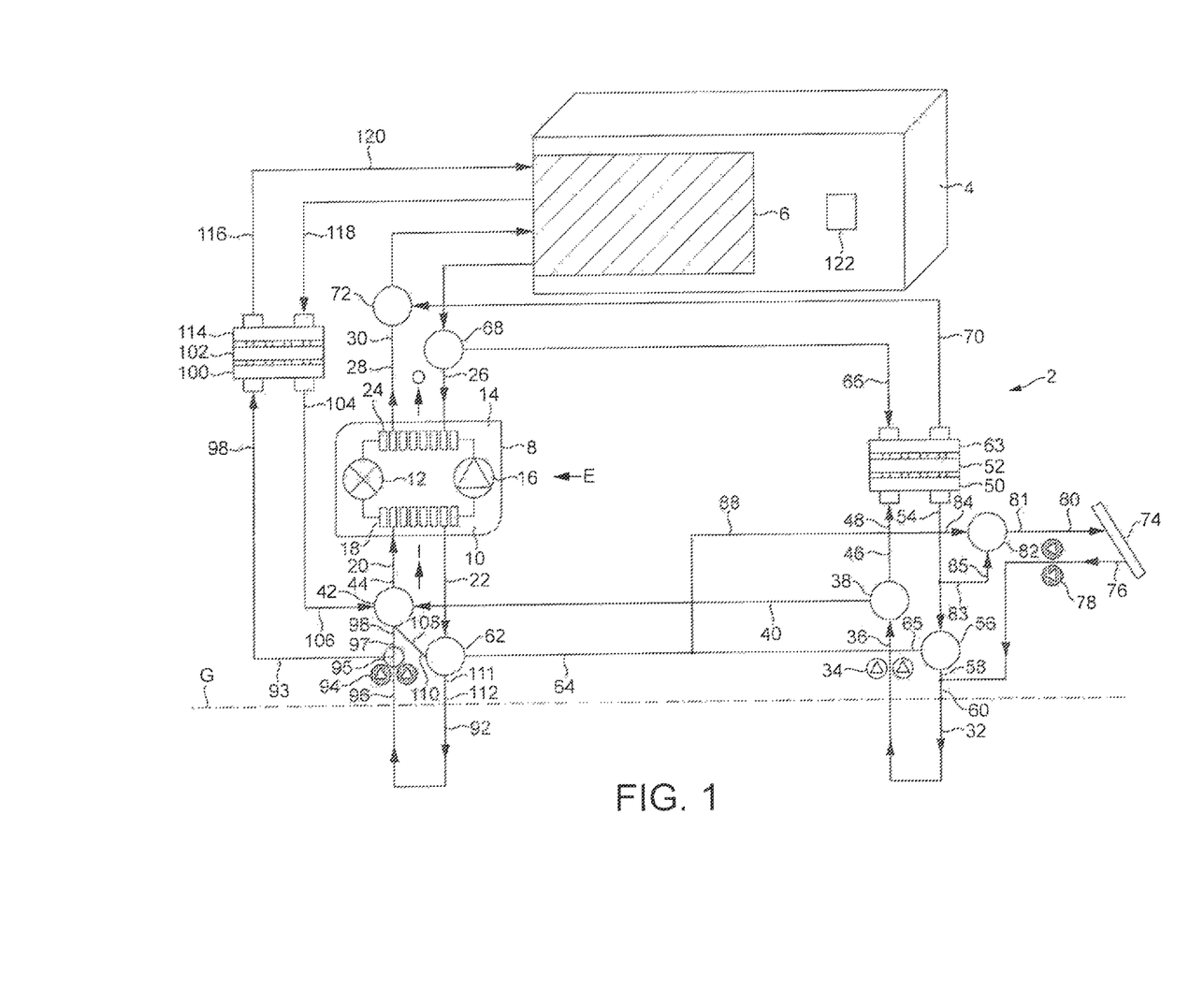
FIG. 1 is a schematic diagram of a thermal energy system coupled to a building in accordance with an embodiment of the present invention.

Referring to FIG. 1, there is shown schematically a thermal energy system 2 coupled to a building 4. The building 4 includes a building system 6 which selectively requires (a) a positive supply of energy to provide heating, (b) a negative supply of energy to provide cooling, or (c) a combination, in any desired proportion, of a positive supply of energy to provide heating and a negative supply of energy to provide cooling, the combination having a net positive, negative or neutral energy demand.

The thermal energy system 2 includes a heat pump system 8, which may comprise a single heat pump, as illustrated, or an assembly of plural heat pumps. The heat pump system 8 typically utilizes a vapor-compression Carnot cycle and includes a primary input side 10, an expansion valve 12, a secondary output side 14 and a compressor 16 connected together to define a loop around which a working fluid is circulated. The heat pump system 8 may use a variety of different refrigerants, which themselves are known in the art. The refrigerant may be a condensing refrigerant, typically used in commercial refrigeration devices, or a non-condensing refrigerant.

On the input side 10, thermal energy is received and caused to heat working fluid in the form of a liquid which is then evaporated in the expansion valve 12. The resultant vaporized working fluid outputs thermal energy on the output side 14, and is then compressed to form a liquid by the compressor 16. The thermal energy input I at the input side 10 combined with the energy E, in the form of electrical energy, to drive the compressor 16 substantially comprises the total thermal energy output 0 on the output side 14. The total thermal energy output on the output side 14 can provide heating to the building system 6.

The input side 10 is coupled, via a heat exchanger 18, to an input line 20 and an output line 22. As described hereinbelow, the input line 20 and output line 22 are selectively connectable within one or more working fluid loops to one or more sources of thermal energy.

The output side 14 is coupled, via a heat exchanger 24, to an input line 26 and an output line 28. The input line 26 and output line 28 are connected within a heat energy working fluid loop 30 extending into the building 4 to provide heat energy to the building system 6.

A first borehole heat exchanger system 32 is located substantially beneath ground level G. The first borehole heat exchanger system 32 comprises any suitable borehole heat exchanger which is capable of extracting thermal energy from the ground when operated in an extraction mode as a heat source, and, conversely, when selectively operated in a replenishment mode as a heat sink, replenishing thermal energy back into the ground.

Typically the first borehole heat exchanger system 32 comprises one or more coaxial borehole heat exchangers, for example as disclosed in the Applicant's earlier patent specifications published as GB-A-2450754 or GB-A-2450755. However, any suitable borehole heat exchanger structure or assembly may be employed.

The first borehole heat exchanger system 32 includes a pump 34 for pumping working fluid, typically an aqueous fluid including an alkylene glycol such as ethylene glycol, around a loop including the first borehole heat exchanger system 32. The pump 34 is provided on an output line 36 of the first borehole heat exchanger system 32. The output line 36 is connected to a first switchable plural-way valve mechanism 38. A first output line 40 from the valve mechanism 38 is connected to a second switchable plural-way valve mechanism 42 which has an output 44 connecting to the input line 20. A second output line 46 from the valve mechanism 38 is connected to an input line 48 of an input side 50 of a first heat exchanger 52, for example a plate heat exchanger although other heat exchanger constructions may be employed. An output line 54 of input side 50 is connected to a third switchable plural-way valve mechanism 56 which has an output 58 connecting to an input line 60 of the first borehole heat exchanger system 32.

Output line 22 of the input side 10 of heat pump system 8 is connected to a fourth switchable plural-way valve mechanism 62. An output line 64 from the valve mechanism 62 is connected to an input line 65 of the third switchable plural-way valve mechanism 56.

The first heat exchanger 52 has an output side 63. An output line 66 of output side 63 is connected to input line 26 by a fifth switchable plural-way valve mechanism 68 and an input line 70 of output side 63 is connected to output line 28 by a sixth switchable plural-way valve mechanism 72.

The first, second, third, fourth, fifth and sixth switchable plural-way valve mechanisms 38, 42, 56, 62, 68, 72 constitute a first switch assembly selectively connecting the first geothermal system 32 to the primary input side 10 of the heat pump 8 or to the secondary output side 14 of the heat pump 8 and the second and fourth switchable plural-way valve mechanisms 42, 62 constitute a second switch assembly selectively connecting the second geothermal system 92 to the primary input side 10 of the heat pump 8.

It may in particular be seem that the first and second switch assemblies are selectively switchable to interconnect the first and second geothermal systems 32, 92 on the primary input side 10 of the heat pump 8 or on the secondary output side 14 of the heat pump 8. This provides a very versatile system using plural geothermal systems and a single heat pump system. Other switching mechanisms and assemblies may be used in accordance with other embodiments of the invention to achieve this inter-connectability between the plural geothermal systems and the heat pump.

A solar thermal energy collector 74 is arranged to collect thermal energy from solar radiation and to heat a working fluid within a loop, and the collector 74 is connected within the thermal energy system 4. The collector 74 has an output line 76 including a pump 78 for pumping working fluid and the output line 76 is connected to the input line 60 of the first borehole heat exchanger system 32. The collector 74 also has an input line 80 connected to an output 81 of a seventh switchable plural-way valve mechanism 82. The valve mechanism 82 has an input 84 connected to the output line 64 by an input line 88 and an input 85 connected by a spur line 83 to the output line 54.

A second borehole heat exchanger system 92 is also substantially located beneath ground level G. The second borehole heat exchanger system 92, like the first borehole heat exchanger system 32, comprises any suitable borehole heat exchanger which is capable of extracting thermal energy from the ground when operated in an extraction mode as a heat source, and, conversely, when selectively operated in a replenishment mode as a heat sink, replenishing thermal energy back into the ground. Typically the second borehole heat exchanger system 92 comprises one or more coaxial borehole heat exchangers, for example as disclosed in the Applicant's earlier patent specifications published as GB-A-2450754 or GB-A-2450755. However, any suitable borehole heat exchanger structure or assembly may be employed.

The second borehole heat exchanger system 92 includes a pump 94 for pumping working fluid, typically an aqueous fluid including an alkylene glycol such as ethylene glycol, around a loop including the second borehole heat exchanger system 92. The pump 94 is provided on an output line 96 of the second borehole heat exchanger system 92. The output line 96 is connected to an eighth switchable plural-way valve mechanism 95. A first output 93 of valve mechanism 95 connects to an input line 98 of an input side 100 of a second heat exchanger 102, for example a plate heat exchanger although other heat exchanger constructions may be employed. An output line 104 of input side 100 is connected as an input 106 to the second switchable plural-way valve mechanism 42 which has a further output 108 connecting to an input 110 of the fourth switchable plural-way valve mechanism 62. An output 111 of the fourth switchable plural-way valve mechanism 62 is connected to an input line 112 of the second borehole heat exchanger system 92.

The second heat exchanger 102 has an output side 114. An output line 116 and an input line 118 of output side 114 are connected within a cooling demand working fluid loop 120 extending into the building 4 to provide cooling to the building system 6.

The first and second heat exchangers 52, 102 are provided to enable the working fluid within, respectively, the heat energy working fluid loop 30 and the cooling demand working fluid loop 120 extending into the building 4 to be different from the working fluid circulating through the first and second borehole heat exchanger systems 32, 92. Typically, the working fluid within the heat energy working fluid loop 30 and the cooling demand working fluid loop 120 comprises water. However, in alternative embodiments either or both of the first and second heat exchangers 52, 102 may be omitted so that the working fluid circulating through the first and second borehole heat exchanger systems 32, 92 is directly fed into the to the building system 6.

A second output 97 of valve mechanism 95 connects to a further input 99 of valve mechanism 42.

The operation of the thermal energy system of FIG. 1 in various modes of operation will now be described. The selection of the various modes of operation depends upon the particular heating and cooling demands of the building system 6 at the current time and also on the thermal energy state of one or both of the first and second borehole heat exchanger systems 32, 92. The various valve mechanisms and the heat pump are operated by a controller 122, schematically illustrated in FIG. 1. The controller receives input control parameters from the building 4 and the borehole heat exchangers, and optionally also from other sources, such as ambient temperature.

In short, the various modes include (but are not limited to):

1. When the first borehole heat exchanger system 32 has sufficient stored geothermal energy to provide the required heating demand and the second borehole heat exchanger system 92 has sufficient geothermal energy storage capacity to provide the required cooling demand, the first borehole heat exchanger system 32 can be independently operated to provide the required heating demand and the second borehole heat exchanger system can be independently operated to provide the required cooling demand, without any need for operating the heat pump system which would require additional energy input to drive the compressor (such an arrangement is known in the art as "free energy", meaning that the energy demands of the building are primarily provided by geothermal energy).
2. When the first borehole heat exchanger system 32 has sufficient stored geothermal energy to provide the required heating demand but the second borehole heat exchanger system 92 has insufficient geothermal energy storage capacity to provide the required cooling demand, the first borehole heat exchanger system 32 can be independently operated to provide the required heating demand and the heat pump system can be operated to extract heat from the building and the second borehole heat exchanger system to provide the required cooling demand.
3. When the first borehole heat exchanger system 32 has insufficient stored geothermal energy to provide the required heating demand but the second borehole heat exchanger system 92 has sufficient geothermal energy storage capacity to provide the required cooling demand, the second borehole heat exchanger system 92 can be independently operated to provide the required cooling demand and the heat pump system can be operated to provide heat to the building in addition to that from the first borehole heat exchanger system to provide the required heating demand.
4. The first and second borehole heat exchanger systems 32, 92 can be simultaneously employed to extract stored geothermal energy and the heat pump system can be operated to provide heat to the building in addition to that from the first and second borehole heat exchanger systems to provide the required heating demand.
5. When the first borehole heat exchanger system 32 has insufficient stored geothermal energy, geothermal energy can be transferred from the second borehole heat exchanger system 92 to the first borehole heat exchanger system 32 in an off peak energy transfer mode.

Figure 2:
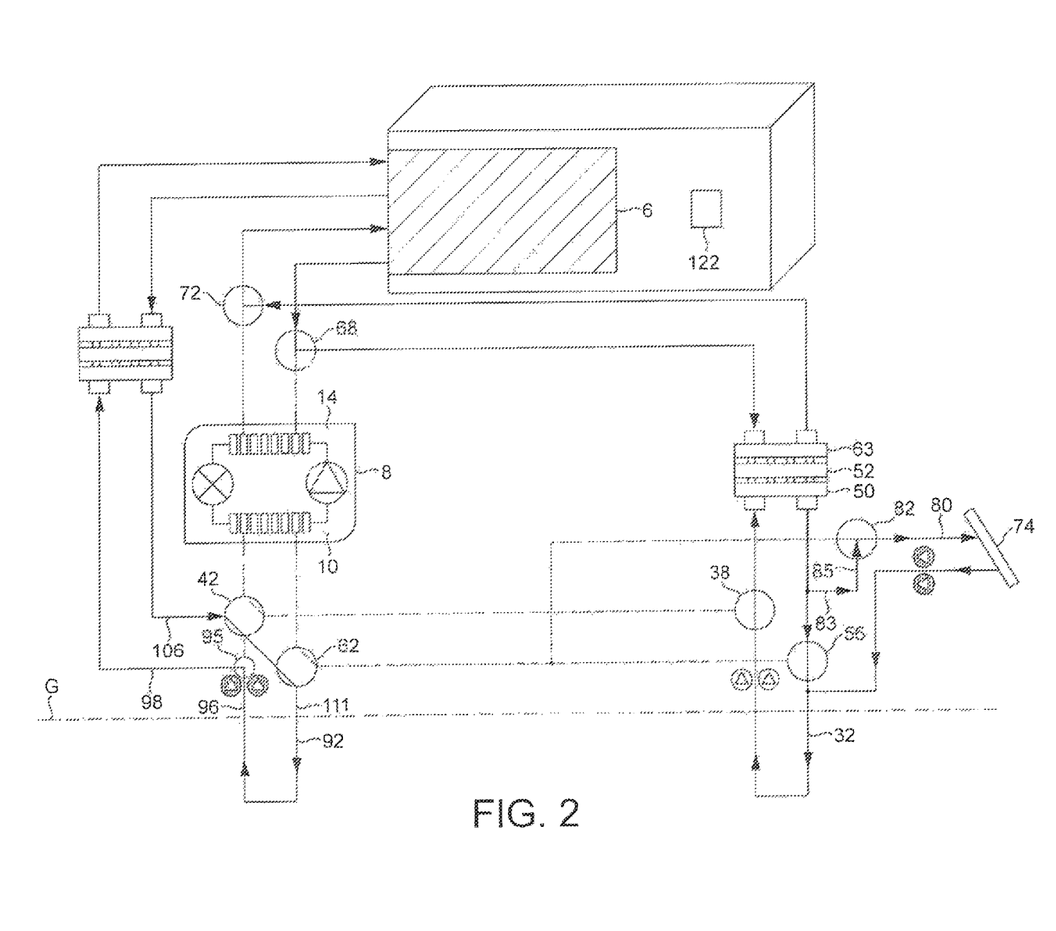
FIG. 2 is a schematic diagram of the thermal energy system of FIG. 1 in a first mode of operation.

Referring first to FIG. 2, in this mode of operation the first borehole heat exchanger system 32 has sufficient stored geothermal energy to provide the required heating demand and the second borehole heat exchanger system 92 has sufficient geothermal energy storage capacity to provide the required cooling demand, the first borehole heat exchanger system 32 can be independently operated to provide the required heating demand and the second borehole heat exchanger system can be independently operated to provide the required cooling demand, without any need for operating the heat pump system which would require additional energy input to drive the compressor (such an arrangement is known in the art as "free energy", meaning that the energy demands of the building are primarily provided by geothermal energy).

In FIGS. 2 to 6, non-functioning fluid lines are indicated by dashed lines.

As shown in FIG. 2, valve mechanisms 42 and 62 are switched to provide a fluid flow between input 106 and output 111. Valve mechanism 95 is switched to provide a fluid flow between output line 96 of the second borehole heat exchanger system 92 and input line 98 of the second heat exchanger 102. The input side 10 of the heat pump system 8 is bypassed. Valve mechanisms 68 and 72 are switched to provide a closed fluid flow loop between the output side 63 of the first heat exchanger 52 and the building system 6. The output side 14 of the heat pump system 8 is bypassed. The heat pump system 8 is not activated. The second borehole heat exchanger system 92 has sufficient geothermal energy storage capacity to provide the required cooling demand. The first borehole heat exchanger system 32 has sufficient stored geothermal energy to provide the required heating demand. However, as shown, optionally the solar thermal collector 74 is connected to the first borehole heat exchanger system 32 to provide supplemental thermal energy. Valve mechanism 82 is switched to provide a fluid connection between input 85 on spur 83 and input line 80 for solar thermal collector 74. Valve mechanisms 38, 56 are switched to provide a direct fluid connection between the first borehole heat exchanger system 32 and the input side 50 of first heat exchanger 52.

Figure 3:
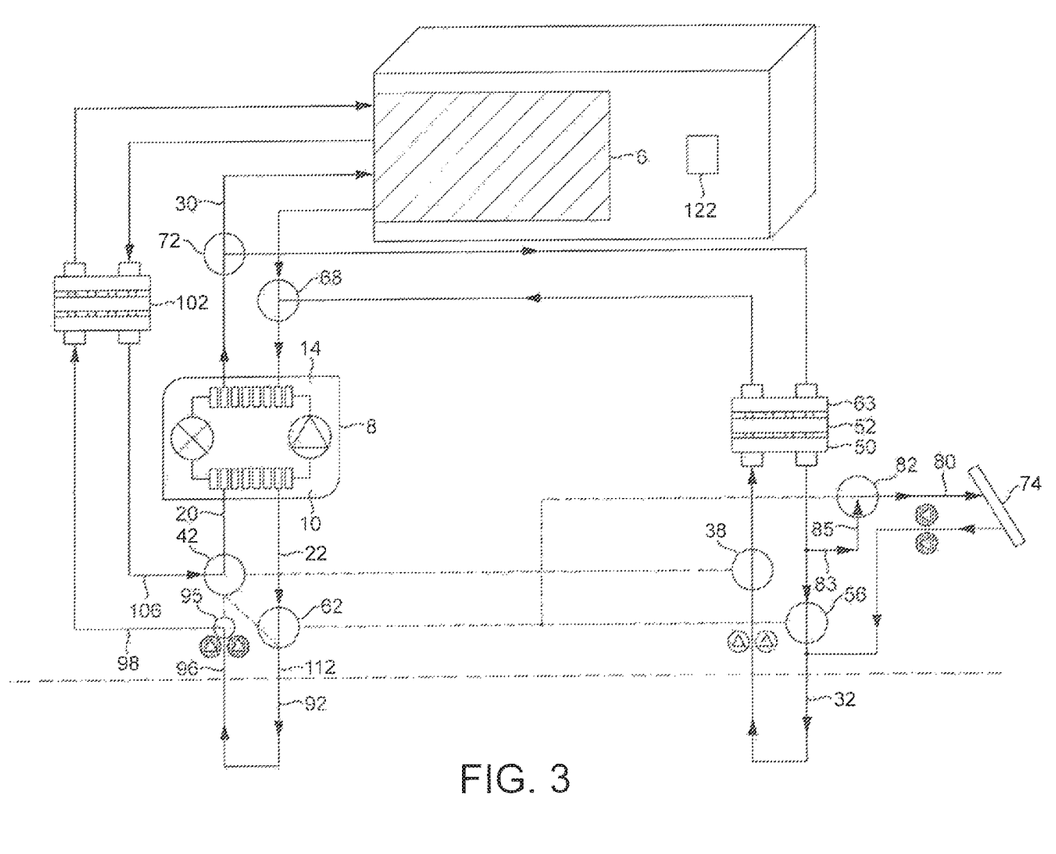
FIG. 3 is a schematic diagram of the thermal energy system of FIG. 1 in a second mode of operation.

Referring next to FIG. 3, in this mode of operation the first borehole heat exchanger system 32 has sufficient stored geothermal energy to provide the required heating demand but the second borehole heat exchanger system 92 has insufficient geothermal energy storage capacity to provide the required cooling demand, the first borehole heat exchanger system 32 can be independently operated to provide the required heating demand and the heat pump system can be operated to extract heat from the building and the second borehole heat exchanger system to provide the required cooling demand.

The heat pump 8 is controlled to provide additional cooling by extracting heat on the input, or primary, side 10 of the heat pump 8 and transferring that extracted heat to the output, or secondary, side 14 of the heat pump 8. The amount of heat extracted is controlled by the controller 122 based upon the amount of additional cooling required in order that the required total cooling is achieved by the cooling loop 120. In FIG. 3, the extracted heat on the output, or secondary, side 14 of the heat pump 8 is provided to the heating loop 30, which conveys heat to the building system 6. The extracted heat is topped up with heat from the first borehole heat exchanger system 32 in order to provide the required total heat to the building system 6. This arrangement uses the heat pump 8 to provide additional cooling and the extracted heat correspondingly reduces the amount of heat extracted from the first borehole heat exchanger system 32 in order to provide the required heating to the building.

Alternatively however, if no heat is required to be provided to the building from the output side 14, then valves 68 and 72 can be configured to connect the output side 14 to the first heat exchanger 52, and valves 38 and 56 can be configured to connect the first heat exchanger 52 to the first borehole heat exchanger system 32. These connections enable the heat from the cooling loop 120 which has been extracted by the heat pump 8 to be delivered to and stored in the first borehole heat exchanger system 32 for subsequent extraction as useful free heating energy.

As shown in FIG. 3, valve mechanism 42 is switched to provide a fluid flow between input 106 from the second heat exchanger 102 and input 20 for heat pump system 8 and the valve mechanism 62 is switched to provide a fluid flow between output 22 from heat pump system 8 and the input 112 of the second borehole heat exchanger system 92. Valve mechanism 95 is switched to provide a fluid flow between output line 96 of the second borehole heat exchanger system 92 and input line 98 of the second heat exchanger 102. Valve mechanisms 68 and 72 are switched to provide fluid flow between the output side 14 of the heat pump system 8 and the building system 6. Heat energy is taken from the building system 6, and from the second borehole heat exchanger system 92, to provide the desired cooling, and fed to the input side 10 of the heat pump system 8. The heat pump system 8 is operated to provide that heat energy back into the building system 6 as useful heating energy in the heat energy working fluid loop 30. The heating demand of the building system 6 exceeds the cooling demand. The first borehole heat exchanger system 32 has sufficient stored geothermal energy to provide the required heating demand, and is connected to the building system 6 substantially as in FIG. 2, and the additional heat energy from the heat pump system 8 is topped up by the geothermal energy from first borehole heat exchanger system 32. Valve mechanisms 68 and 72 are therefore also switched to provide fluid flow between the output side 63 of the first heat exchanger system 52 and the building system 6. As shown, optionally the solar thermal collector 74 is connected to the first borehole heat exchanger system 32 to provide supplemental thermal energy. Valve mechanism 82 is switched to provide a fluid connection between input 85 on spur 83 and input line 80 for solar thermal collector 74 and valve mechanisms 38, 56 are switched to provide a fluid connection between the first borehole heat exchanger system 32 and the input side 50 of first heat exchanger 52.

Figure 4:
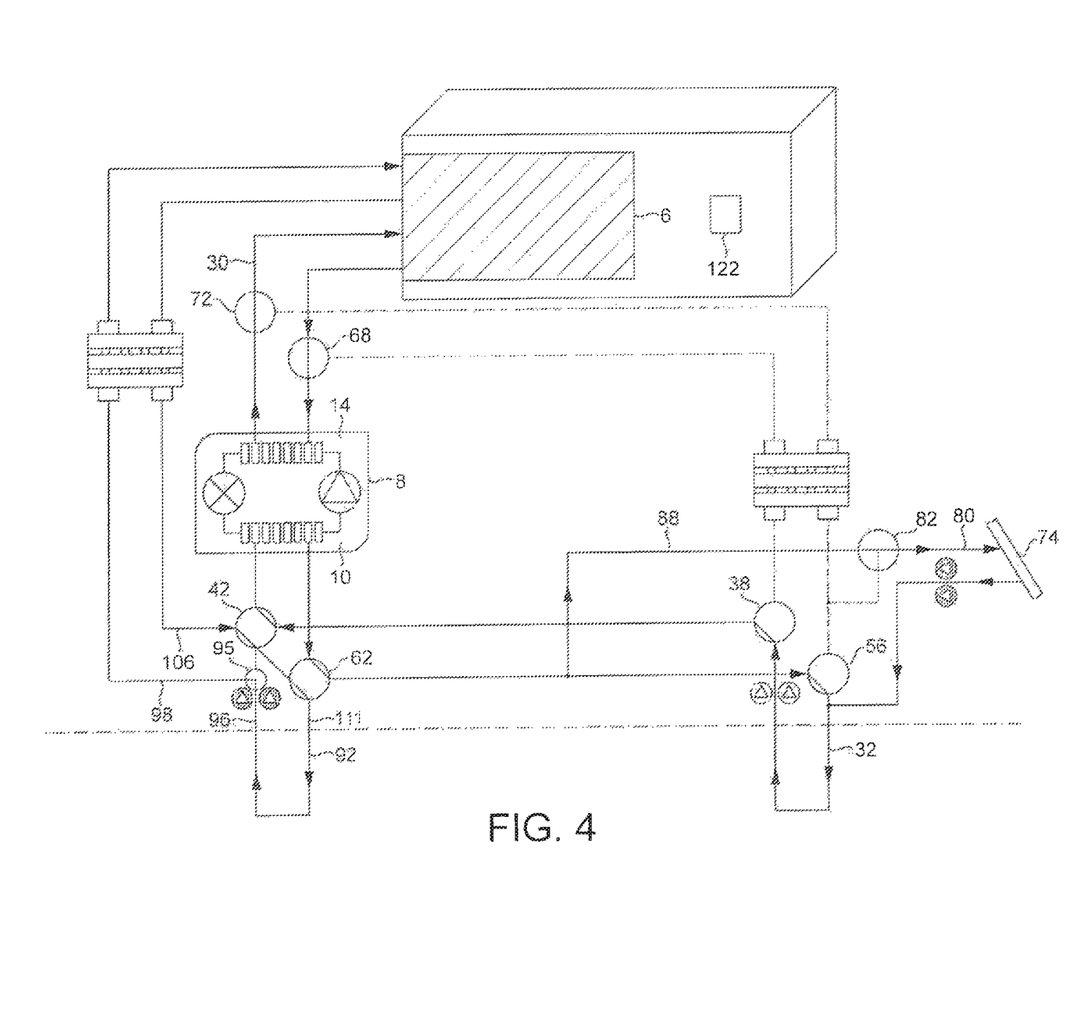
FIG. 4 is a schematic diagram of the thermal energy system of FIG. 1 in a third mode of operation.

Referring next to FIG. 4, in this mode of operation the first borehole heat exchanger system 32 has insufficient stored geothermal energy to provide the required heating demand but the second borehole heat exchanger system 92 has sufficient geothermal energy storage capacity to provide the required cooling demand, the second borehole heat exchanger system 92 can be independently operated to provide the required cooling demand and the heat pump system can be operated to provide heat to the building in addition to that from the first borehole heat exchanger system to provide the required heating demand.

As shown in FIG. 4, valve mechanisms 42 and 62 are switched to provide a fluid flow between input 106 and output 111. The input side 10 of the heat pump system 8 is bypassed from the second borehole heat exchanger system 92 which has sufficient geothermal energy storage capacity to provide the required cooling demand.

Valve mechanisms 38, 56 and valve mechanisms 42 and 62 are switched to provide a direct fluid connection between the first borehole heat exchanger system 32 and the input side 10 of the heat pump system 8. Valve mechanism 95 is switched to provide a fluid flow between output line 96 of the second borehole heat exchanger system 92 and input line 98 of the second heat exchanger 102. The first heat exchanger 52 is bypassed. Valve mechanisms 68 and 72 are switched to provide a closed fluid flow loop between the output side 14 of the heat pump system 8 and the building system 6. The heat pump system 8 is activated because the first borehole heat exchanger system 32 has insufficient stored geothermal energy to provide the required heating demand. Heat energy is taken from the first borehole heat exchanger system 32 and fed to the input side 10 of the heat pump system 8. The heat pump system 8 is operated to provide additional heat energy from the heat pump system 8 which supplements the geothermal energy, and the total heat energy is supplied to the building system 6 as useful heating energy in the heat energy working fluid loop 30.

As shown, optionally the solar thermal collector 74 is connected to the first borehole heat exchanger system 32 to provide supplemental thermal energy. Valve mechanism 82 is switched to provide a fluid connection between line 88 and input line 80 for solar thermal collector 74.

Figure 5:
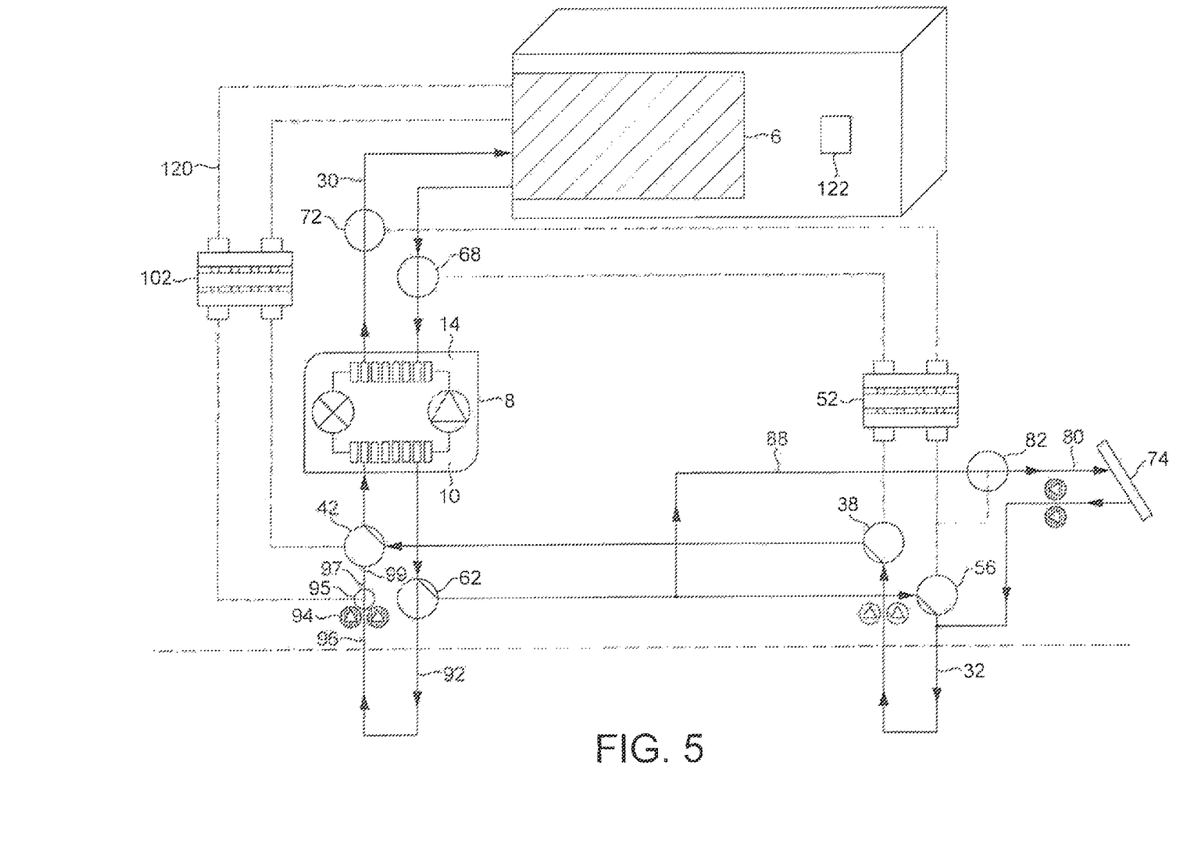
FIG. 5 is a schematic diagram of the thermal energy system of FIG. 1 in a fourth mode of operation.

Referring next to FIG. 5, in this mode of operation the first and second borehole heat exchanger systems 32, 92 can be simultaneously employed to extract stored geothermal energy and the heat pump system can be operated to provide heat to the building in addition to that from the first and second borehole heat exchanger systems to provide the required heating demand.

As shown in FIG. 5, valve mechanisms 42 and 62 are switched to provide a direct fluid connection between the second borehole heat exchanger system 92 and the input side 10 of the heat pump system 8. Valve mechanism 95 is switched to provide a fluid flow between output line 96 of the second borehole heat exchanger system 92 and input 99 of valve mechanism 42. The cooling loop 120 is bypassed. The second heat exchanger 102 is bypassed. Valve mechanisms 38, 56 and valve mechanisms 42 and 62 are also switched to provide a direct fluid connection between the first borehole heat exchanger system 32 and the input side 10 of the heat pump system 8. The first heat exchanger 52 is bypassed. Valve mechanisms 68 and 72 are switched to provide a closed fluid flow loop between the output side 14 of the heat pump system 8 and the building system 6. The heat pump system 8 is activated, and the second borehole heat exchanger system 92 also connected to the input side 10 of the heat pump system 8, because the first borehole heat exchanger system 32 has insufficient stored geothermal energy to provide the required heating demand. Heat energy is taken from the first and second borehole heat exchanger systems 32, 92 and fed to the input side 10 of the heat pump system 8. The heat pump system 8 is operated to provide additional heat energy from the heat pump system 8 which supplements the geothermal energy, and the total heat energy is supplied to the building system 6 as useful heating energy in the heat energy working fluid loop 30.

As shown, as for FIG. 4 optionally the solar thermal collector 74 is connected to the first borehole heat exchanger system 32 to provide supplemental thermal energy. Valve mechanism 82 is switched to provide a fluid connection between line 88 and input line 80 for solar thermal collector 74.

Figure 6:
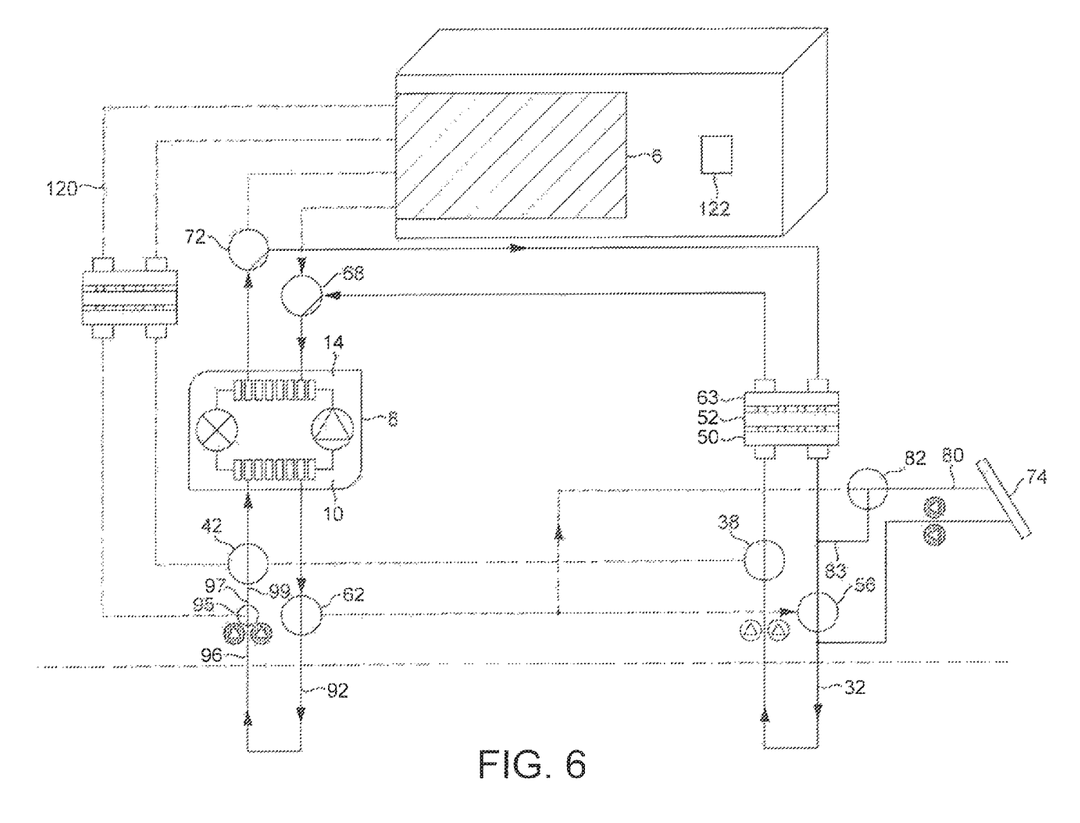
FIG. 6 is a schematic diagram of the thermal energy system of FIG. 1 in a fifth mode of operation.

Referring next to FIG. 6, in this mode of operation the first borehole heat exchanger system 32 has insufficient stored geothermal energy, and geothermal energy can be transferred from the second borehole heat exchanger system 92 to the first borehole heat exchanger system 32 in an off peak energy transfer mode. This provides a higher grade energy store in the first borehole heat exchanger system 32 which improves the thermal efficiency of the heat pump system when inputted with thermal energy from the first borehole heat exchanger system 32.

As shown in FIG. 6 valve mechanisms 42 and 62 are switched to provide a direct fluid connection between the second borehole heat exchanger system 92 and the input side 10 of the heat pump system 8. Valve mechanism 95 is switched to provide a fluid flow between output line 96 of the second borehole heat exchanger system 92 and input 99 of valve mechanism 42. The cooling loop 120 is bypassed. The second heat exchanger 102 is bypassed. Valve mechanisms 68 and 72 are switched to provide a closed fluid flow loop between the output side 14 of the heat pump system 8 and the output side 63, which in this mode acts as an input side, of the first heat exchanger 52. The building system 6 is bypassed. Valve mechanisms 38, 56 are also switched to provide a direct fluid connection between the input side 50, which in this mode acts as an output side, of the first heat exchanger 52 and the first borehole heat exchanger system 32. The heat pump system 8 is activated, and the second borehole heat exchanger system 92 connected to the input side 10 of the heat pump system 8 provides thermal energy to the first borehole heat exchanger system 32. The heat pump system 8 is operated to provide additional heat energy from the heat pump system 8 which supplements the geothermal energy from the second borehole heat exchanger system 92, and the total heat energy is supplied to the first borehole heat exchanger system 32 for subsequent use as useful heating energy for the building system 6 in the modes previously discussed herein.

As shown, optionally the solar thermal collector 74 is connected to the first borehole heat exchanger system 32 to provide supplemental thermal energy. Valve mechanism 82 is switched to provide a fluid connection between spur 83 and input line 80 for solar thermal collector 74.

The embodiments of the present invention described herein are purely illustrative and do not limit the scope of the claims. For example, the valves may be substituted by alternative fluid switching devices; and alternative modes of operation may be determined based on the particular characteristics of various alternative borehole heat exchangers and/or building systems.

Yet further, in additional embodiments of the invention, as modifications of the illustrated embodiments, the first borehole heat exchanger system comprises one or a plurality of first heat exchangers and/or the second borehole heat exchanger system comprises one or a plurality of second heat exchangers.

Various other modifications to the present invention will be readily apparent to those skilled in the art.

The invention claimed is:

1. A thermal energy system adapted to be coupled to a building energy system which selectively provides heating and/or cooling to a building, the thermal energy system comprising
    (a) a heat pump system having an output connected to a heating output of the thermal energy system, the output being a working fluid output,
    (b) a first geothermal system in which working fluid is, in use, circulated,
    (c) a first switch assembly for selectively thermally connecting the first geothermal system to at least one of (i) the heating output of the thermal energy system (ii) and an input of the heat pump system, the input being a working fluid input,
    (d) a second geothermal system in which working fluid is, in use, circulated, and
    (e) a second switch assembly for selectively thermally connecting the second geothermal system to at least one of (i) a cooling output of the thermal energy system and (ii) the input of the heat pump system,
    the first and second switch assemblies are selectively switchable to thermally interconnect the first and second geothermal systems to each other on a primary input side of the heat pump system or on a second output side of the heat pump system, the first and second switch assemblies are adapted to be switchable to provide a first operation mode which thermally connects the first geothermal system to the heating output and the second geothermal system to the cooling output, and the heat pump system being thermally unconnected to the first and second geothermal systems.

2. The thermal energy system according to claim 1 wherein the first geothermal system comprises at least one borehole heat exchanger.

3. The thermal energy system according to claim 1 wherein the second geothermal system comprises at least one borehole heat exchanger.

4. The thermal energy system according to claim 1 further comprising a first heat exchanger between the first geothermal system and the heating output, the first heat exchanger having an input switchably connectable to the first geothermal system and an output connected to the heating output.

5. The thermal energy system according to claim 4 wherein a first working fluid circuit is defined between the output of the heat pump system, the output of the first heat exchanger and the heating output, and a second working fluid circuit is defined between the input of the first heat exchanger and the first geothermal system.

6. The thermal energy system according to claim 1 further comprising a solar thermal energy collector adapted to heat the working fluid and fluidly connected to the first geothermal system.

7. The thermal energy system according to claim 1 further comprising a second heat exchanger between the second geothermal system and the cooling output, the second heat exchanger having an input switchably connectable to the second geothermal system and an output connected to the cooling output.

8. The thermal energy system according to claim 7 wherein a third working fluid circuit is defined between the output of the second heat exchanger and the cooling output, and a fourth working fluid circuit is defined between the input of the second heat exchanger and the second geothermal system.

9. The thermal energy system according to claim 8, and further comprising a first heat exchanger between the first geothermal system and the heating output, the first heat exchanger having an input switchably connectable to the first geothermal system and an output connected to the heating output wherein a first working fluid circuit is defined between the output of the heat pump system, the output of the first heat exchanger and the heating output, and a second working fluid circuit is defined between the input of the first heat exchanger and the first geothermal system, and the second and fourth working fluid circuits are switchably connectable by the first and second switch assemblies and a common working fluid is present in the first and second geothermal systems and on an input side of each of the heat pump system and the first and second heat exchangers.

10. The thermal energy system according to claim 1 further comprising a third switch assembly between the output of the heat pump system and the first switch assembly to enable the output of the heat pump system to be selectively connectable to the first geothermal system.

11. The thermal energy system according to claim 1 wherein the switch assemblies are adapted to be switchable to provide a second operation mode which thermally connects the first geothermal system to the heating output and the second geothermal system to the input of the heat pump system and the cooling output, the output of the heat pump system being thermally connected to the heating output.

12. The thermal energy system according to claim 1 wherein the switch assemblies are adapted to be switchable to provide a third operation mode which thermally connects the second geothermal system to the cooling output and the first geothermal system to the input of the heat pump system and the heating output, the output of the heat pump system being thermally connected to the heating output.

13. The thermal energy system according to claim 1 wherein the switch assemblies are adapted to be switchable to provide a fourth operation mode which thermally connects the first and second geothermal systems to the input of the heat pump system, the output of the heat pump system being thermally connected to the heating output.

14. The thermal energy system according to claim 1 wherein the switch assemblies are adapted to be switchable to provide a fifth operation mode which thermally connects together the first and second geothermal systems via the heat pump system, the heating output and cooling output being thermally unconnected to the first and second geothermal systems.

15. The thermal energy system according to claim 1 wherein the heat pump system comprises one or more heat pumps utilizing a vapor-compression cycle.

16. The thermal energy system according to claim 15 wherein the heat pump system comprises at least one working fluid circuit including an input heat exchanger, an expansion device, an output heat exchanger and a compressor.

17. A thermal energy system adapted to be coupled to a building energy system which selectively provides heating and/or cooling to a building, the thermal energy system comprising
  (a) a heat pump system having an output connected to a heating output of the thermal energy system, the output being a working fluid output,
  (b) a first geothermal system in which working fluid is, in use, circulated,
  (c) a first switch assembly for selectively thermally connecting the first geothermal system to at least one of (i) the heating output of the thermal energy system (ii) and an input of the heat pump system, the input being a working fluid input,
  (d) a second geothermal system in which working fluid is, in use, circulated, and
  (e) a second switch assembly for selectively thermally connecting the second geothermal system to at least one of (i) a cooling output of the thermal energy system and (ii) the input of the heat pump system,
  the first and second switch assemblies are selectively switchable to thermally interconnect the first and second geothermal systems to each other on a primary input side of the heat pump system or on a second output side of the heat pump system,
  the first and second switch assemblies are adapted to be switchable to provide a first operation mode which thermally connects together the first and second geothermal systems via the heat pump system, and
  the heating output and cooling output being thermally unconnected to the first and second geothermal systems.

18. The thermal energy system according to claim 17 wherein the heat pump system comprises one or more heat pumps utilizing a vapor-compression cycle.

19. The thermal energy system according to claim 18 wherein the heat pump system comprises at least one working fluid circuit including an input heat exchanger, an expansion device, an output heat exchanger and a compressor.

20. The thermal energy system according to claim 17 wherein the first geothermal system comprises at least one borehole heat exchanger.

21. The thermal energy system according to claim 17 wherein the second geothermal system comprises at least one borehole heat exchanger.

22. The thermal energy system according to claim 17 further comprising a first heat exchanger between the first geothermal system and the heating output, the first heat exchanger having an input switchably connectable to the first geothermal system and an output connected to the heating output.

23. The thermal energy system according to claim 22 wherein a first working fluid circuit is defined between the output of the heat pump system, the output of the first heat exchanger and the heating output, and a second working fluid circuit is defined between the input of the first heat exchanger and the first geothermal system.

24. The thermal energy system according to claim 17 further comprising a solar thermal energy collector adapted to heat the working fluid and fluidly connected to the first geothermal system.

25. The thermal energy system according to claim 17 further comprising a second heat exchanger between the second geothermal system and the cooling output, the second heat exchanger having an input switchably connectable to the second geothermal system and an output connected to the cooling output.

26. The thermal energy system according to claim 25 wherein a third working fluid circuit is defined between the output of the second heat exchanger and the cooling output, and a fourth working fluid circuit is defined between the input of the second heat exchanger and the second geothermal system.

27. The thermal energy system according to claim 26 and further comprising a first heat exchanger between the first geothermal system and the heating output, the first heat exchanger having an input switchably connectable to the first geothermal system and an output connected to the heating output wherein a first working fluid circuit is defined between the output of the heat pump system, the output of the first heat exchanger and the heating output, and a second working fluid circuit is defined between the input of the first heat exchanger and the first geothermal system, and the second and fourth working fluid circuits are switchably connectable by the first and second switch assemblies and a common working fluid is present in the first and second geothermal systems and on an input side of each of the heat pump system and the first and second heat exchangers.

28. The thermal energy system according to claim 17 further comprising a third switch assembly between the output of the heat pump system and the first switch assembly to enable the output of the heat pump system to be selectively connectable to the first geothermal system.

29. The thermal energy system according to claim 17 wherein the switch assemblies are adapted to be switchable to provide a second operation mode which connects the first geothermal system to the heating output and the second geothermal system to the cooling output, the heat pump system being unconnected to the first and second geothermal systems.

30. The thermal energy system according to claim 17 wherein the switch assemblies are adapted to be switchable to provide a third operation mode which connects the first geothermal system to the heating output and the second geothermal system to the input of the heat pump system and the cooling output, the output of the heat pump system being connected to the heating output.

31. The thermal energy system according to claim 17 wherein the switch assemblies are adapted to be switchable to provide a fourth operation mode which connects the second geothermal system to the cooling output and the first geothermal system to the input of the heat pump system and the heating output, the output of the heat pump system being connected to the heating output.

* * * * *